US012290936B2

(12) United States Patent
Handeck et al.

(10) Patent No.: US 12,290,936 B2
(45) Date of Patent: May 6, 2025

(54) STOPPING A PRODUCTION MACHINE ON A COLLISION-FREE PATH

(71) Applicant: Siemens Aktiengesellschaft, Munich (DE)

(72) Inventors: Jörg Handeck, Erlangen (DE); Steffen Mihatsch, Renningen (DE); Steffen Schmauder, Renningen (DE); Martin Sturm, Renningen (DE)

(73) Assignee: Siemens Aktiengesellschaft, Munich (DE)

(*) Notice: Subject to any disclaimer, the term of this patent is extended or adjusted under 35 U.S.C. 154(b) by 390 days.

(21) Appl. No.: 17/764,060

(22) PCT Filed: Aug. 18, 2020

(86) PCT No.: PCT/EP2020/073097
§ 371 (c)(1),
(2) Date: Mar. 25, 2022

(87) PCT Pub. No.: WO2021/058201
PCT Pub. Date: Apr. 1, 2021

(65) Prior Publication Data
US 2022/0371197 A1   Nov. 24, 2022

(30) Foreign Application Priority Data
Sep. 27, 2019 (EP) .................... 19200160

(51) Int. Cl.
B25J 9/16 (2006.01)
(52) U.S. Cl.
CPC .................. B25J 9/1676 (2013.01)
(58) Field of Classification Search
CPC .......... B25J 9/1676; B25J 9/1666; B25J 9/16; G05B 19/4061
(Continued)

(56) References Cited

U.S. PATENT DOCUMENTS

2003/0225479 A1    12/2003  Waled
2008/0243387 A1*   10/2008  Schinerl ............ G05B 19/4061
                                              701/301
(Continued)

FOREIGN PATENT DOCUMENTS

CN    101512453 A    8/2009
CN    105710880 A    6/2016
(Continued)

OTHER PUBLICATIONS

PCT International Search Report and Written Opinion of International Searching Authority mailed Oct. 21, 2020 corresponding to PCT International Application No. PCT/EP2020/073097 filed Aug. 18, 2020.
(Continued)

Primary Examiner — Adam R Mott
Assistant Examiner — Joseph Anthony Trias
(74) Attorney, Agent, or Firm — Henry M. Feiereisen LLC

(57) ABSTRACT

A numerical controller uses specifications to control position-controlled axes of a production machine and determines a current group of position setpoint values and groups of position setpoint values expected for a forecast horizon. The numerical controller checks for the risk of a collision between at least one element moved by the position-controlled axes and at least one other element. The numerical controller carries out the same check for the expected groups. If there is no risk of collision, it stores the expected groups in a braking path memory and uses the current group. If there is the risk of a collision, it changes the axes along a path to a standstill defined by the braking path memory and braking is effected along a path which has been previously checked for the risk of a collision and for which no risk of a collision has been detected.

7 Claims, 3 Drawing Sheets

(58) Field of Classification Search
USPC .......................................................... 700/255
See application file for complete search history.

(56) References Cited

U.S. PATENT DOCUMENTS

| | | |
|---|---|---|
| 2010/0087948 A1* | 4/2010 | Yamaguchi ........ G05B 19/4069 |
| | | 703/7 |
| 2016/0089787 A1 | 3/2016 | Kuroshita |
| 2016/0176048 A1 | 6/2016 | Zimmermann et al. |
| 2017/0080565 A1 | 3/2017 | Dalibard et al. |
| 2019/0033823 A1* | 1/2019 | Satou ................. G05B 19/4141 |
| 2019/0196480 A1* | 6/2019 | Taylor .................. G05D 1/0223 |

FOREIGN PATENT DOCUMENTS

| | | |
|---|---|---|
| CN | 106573377 A | 4/2017 |
| DE | 10226140 A1 | 1/2004 |
| DE | 102016012230 A1 | 3/2016 |
| DE | 10 2018 203 078 B3 | 5/2019 |
| WO | WO 2006/029432 A2 | 3/2006 |
| WO | WO 2009156069 A1 | 12/2009 |

OTHER PUBLICATIONS

Yang Zheng et al; "Track planning of hydraulically driven mechanical arms"; Mechanical Design and Research; vol. 25; No. 2; published: Apr. 20, 2009; DOI: 10.13952/j.cnkl.jofmdr., 2009.02.011.

* cited by examiner

STOPPING A PRODUCTION MACHINE ON A COLLISION-FREE PATH

CROSS-REFERENCES TO RELATED APPLICATIONS

This application is the U.S. National Stage of International Application No. PCT/EP2020/073097, filed Aug. 18, 2020, which designated the United States and has been published as International Publication No. WO 2021/058201 A1 and which claims the priority of European Patent Application, Serial No. 19200160.0, filed Sep. 27, 2019, pursuant to 35 U.S.C. 119 (a)-(d).

BACKGROUND OF THE INVENTION

The present invention is based on an operating method for a numerical controller, wherein the numerical controller executes a system program, wherein the numerical controller, while executing the system program,
a) while utilizing specifications for position-controlled axes of a production machine controlled by the numerical controller, ascertains a current group of position setpoint values,
b) checks whether, during actuation of the position-controlled axes with the current group of position setpoint values, there is the risk of a collision of at least one element moved by the actuation of the position-controlled axes with at least one other element,
c) if it does not identify a risk of a collision in step b), actuates the position-controlled axes with the current group of position setpoint values and repeats the operating method starting with the step a), and
d) if it identifies the risk of a collision in step b), brings the position-controlled axes to a standstill, The present invention is furthermore based on a system program for a numerical controller, wherein the system program comprises machine code that can be executed by the numerical controller, wherein the execution of the machine code by the numerical controller causes the numerical controller to carry out an operating method of this kind.

The present invention is furthermore based on a numerical controller, wherein the numerical controller is programmed with a system program of this kind, so that the numerical controller carries out an operating method of this kind.

The present invention is furthermore based on a production machine,
   wherein the production machine has a plurality of position-controlled axes, by means of which an element of the production machine can be displaced,
   wherein the production machine has a numerical controller of this kind, by which the position-controlled axes are actuated.

Numerical controllers, the associated production machines and the modes of operation for numerical controllers and production machines are generally known.

When production machines are operated—for example, machine tools, robots or other processing machines—there is the risk that moving elements of the production machine collide with other moving elements or with static elements of the production machine. In the event that the production machine is embodied as a machine tool, a contact of a tool of a machine tool with the workpiece to be machined may, in some circumstances, represent a collision. Unwanted collisions may lead to damage to the elements colliding with one another, for example a breaking off of a tool, a bending of a holding arm, a scratching of a workpiece, among others. Often, collisions of this kind are also associated with downtimes of the production machine.

The collision may have a variety of causes. For example, the production machine may have been incorrectly programmed. It is also possible for elements to have been manually mounted in an incorrect manner, for example, in the case of a machine tool, a workpiece in a clamp. A further possible cause is a faulty specification of a displacement movement by an operator.

Many software-supported systems are known for the avoidance of collisions. These are based on various approaches, but always comprise a modeling of the production machine in three-dimensional space and take into consideration the dimensions of the various elements of the production machine and the kinematics thereof. The known systems are capable of avoiding collisions in a large number of situations. However, the prior art systems have deficiencies, particularly in the processing of real time events that may lead, during the execution of a part program or the like, to an unexpected, spontaneous movement, effectively at the last moment. Movements of this kind may be caused by what are known as asynchronous movements, synchronous actions, coupled movements and user inputs (particularly in the so-called JOG mode), for example. Other causes are also possible.

In the prior art, it is known for real time events of this kind to not be taken into consideration at all as part of the predictive ascertaining of the risk of a collision. Instead, they are only taken into consideration when they actually occur. In this case, the risk of a real time event leading to a collision is simply accepted.

It is furthermore known in the prior art to take real time events of this kind into consideration by the elements of the production machine having to maintain a minimum distance from one another. If movements are preset, during which the minimum distance is undershot, either the respective movement is not permitted or at least the displacement speed Is reduced. By way of this procedure, although collisions can be avoided when real time events occur, this solution has the disadvantage that movements which, as such, do not cause a collision but during which the minimum spacing is undershot, are not possible, or at least are only possible at a reduced speed and therefore with reduced productivity. The possibilities of the production machine, as far as the approaching of elements of the production machine to one another or to other elements is concerned, therefore cannot be used, or can only be used with a reduced productivity.

If the risk of a collision is identified, then what is known as an uncontrolled braking generally takes place in the prior art. In this kind of braking, each position-controlled axis is brought to a standstill as quickly as possible, independently of the other position-controlled axes. With this procedure, it is only then possible to avoid collisions with certainty if the elements of the production machine always have to maintain a minimum distance from one another.

The object of the present invention consists in creating possibilities by means of which the productivity of the production machine can be optimized and yet, despite the consideration of real time events during the ascertaining of the position setpoint values, a collision of elements of the production machine during operation can be avoided with a probability bordering on certainty.

SUMMARY OF THE INVENTION

The object is achieved by an operating method as set forth hereinafter. Advantageous embodiments of the operating method are the subject matter of dependent claims.

According to the invention, an operating method is created for a numerical controller of the kind mentioned in the introduction, in which the numerical controller, while executing the system program, a) while utilizing specifications for position-controlled axes of a production machine controlled by the numerical controller, ascertains a current group of position setpoint values and furthermore ascertains groups of position setpoint values expected for a forecast horizon, b) both checks whether, during actuation of the position-controlled axes with the current group of position setpoint values, there is the risk of a collision of at least one element moved by the actuation of the position-controlled axes with at least one other element, and also checks whether, during actuation of the position-controlled axes with the expected group of position setpoint values, there is the risk of a collision of at least one element moved by the actuation of the position-controlled axes with at least one other element, c) if it does not identify a risk of a collision in step b), actuates the position-controlled axes with the current group of position setpoint values, stores the expected groups of position setpoint values in a braking path memory and repeats the operating method starting with the step a), and d) if it identifies the risk of a collision in step b), brings the position-controlled axes to a standstill along a path that is defined by groups of position setpoint values stored in the braking path memory.

This is because, when the numerical controller identifies the risk of a collision, a braking takes place along a path that has already been checked in advance for the risk of a collision and for which no risk of a collision was identified. Thus, the bringing to a standstill can take place along a path on which no collision takes place.

As a rule, the numerical controller actuates the position-controlled axes with a time interval again in each case with a current group of position setpoint values in each case. It is possible for the performance capability (performance) of the numerical controller to be so high that the numerical controller carries out the steps a) to c) almost instantaneously (in particular within a single time interval). In this case, no particular measures have to be taken beyond the steps according to the invention. It is also possible, however, for the numerical controller to require multiple time intervals to carry out the steps a) to c)—in particular to carry out the step b). Specifically, the numerical controller may require a maximum of a first number of time intervals for this purpose. In this case, the numerical controller delays the storage of the expected groups of position setpoint values in the braking path memory and the actuation of the position-controlled axes, calculated as of the ascertaining of a new current group of position setpoint values, preferably by a second number of time intervals. As a result, it is achieved that the "old" path, which has already been checked for freedom from collisions, is retained until the "new" path has been fully checked for freedom from collisions. The "old" path is only replaced by the "new" path if no risk of a collision is identified. If the risk of a collision is identified, then a standstill takes place on the "old" path.

The second number of time intervals is preferably measured such that the numerical controller, during the second number of time intervals, is capable of checking for the entire forecast horizon whether, when the position-controlled axes are actuated with the expected groups of position setpoint values, there is the risk of a collision of at least one element moved by the actuation of the position-controlled axes with at least one other element. This makes it possible to ensure that the checking of the expected path has concluded before the position controlled axis is actuated with the associated current group of position setpoint values.

In order to delay the actuation of the position-controlled axes, it is possible for the numerical controller to store, for example, the current group of position setpoint values newly ascertained in each case at a storage time in a buffer memory, and to read it out of the buffer memory at a readout time.

It is possible for the second number of time intervals to be a static variable. In this case, the second number of time intervals can be ascertained, in particular, taking into consideration the dynamics of the position-controlled axes, i.e. the maximum possible displacement speeds and the maximum possible accelerations. Alternatively, it is possible for the numerical controller to set the second number of time intervals in a dynamic manner as a function of a displacement speed of at least one of the position-controlled axes. In this case, the second number of time intervals is thus set while taking into consideration the actual displacement speed and the maximum possible accelerations of the position-controlled axes.

The object is furthermore achieved by a system program of the kind mentioned in the introduction, which system program is embodied such that the execution of the machine code by the numerical controller causes the numerical controller to carry out an operating method according to the invention.

The object is furthermore achieved by a numerical controller of the kind mentioned in the introduction, which numerical controller is programmed with a system program according to the invention, so that the numerical controller carries out an operating method according to the invention.

The object is furthermore achieved by a production machine with a numerical controller embodied according to the invention.

BRIEF DESCRIPTION OF THE DRAWING

The above-described properties, features and advantages of this invention as well as the manner in which they are achieved will become clearer and more comprehensible in conjunction with the following description of the exemplary embodiments, which are explained in more detail in conjunction with the drawings, in which, in a schematic representation.

DETAILED DESCRIPTION OF PREFERRED EMBODIMENTS

Figure 1:
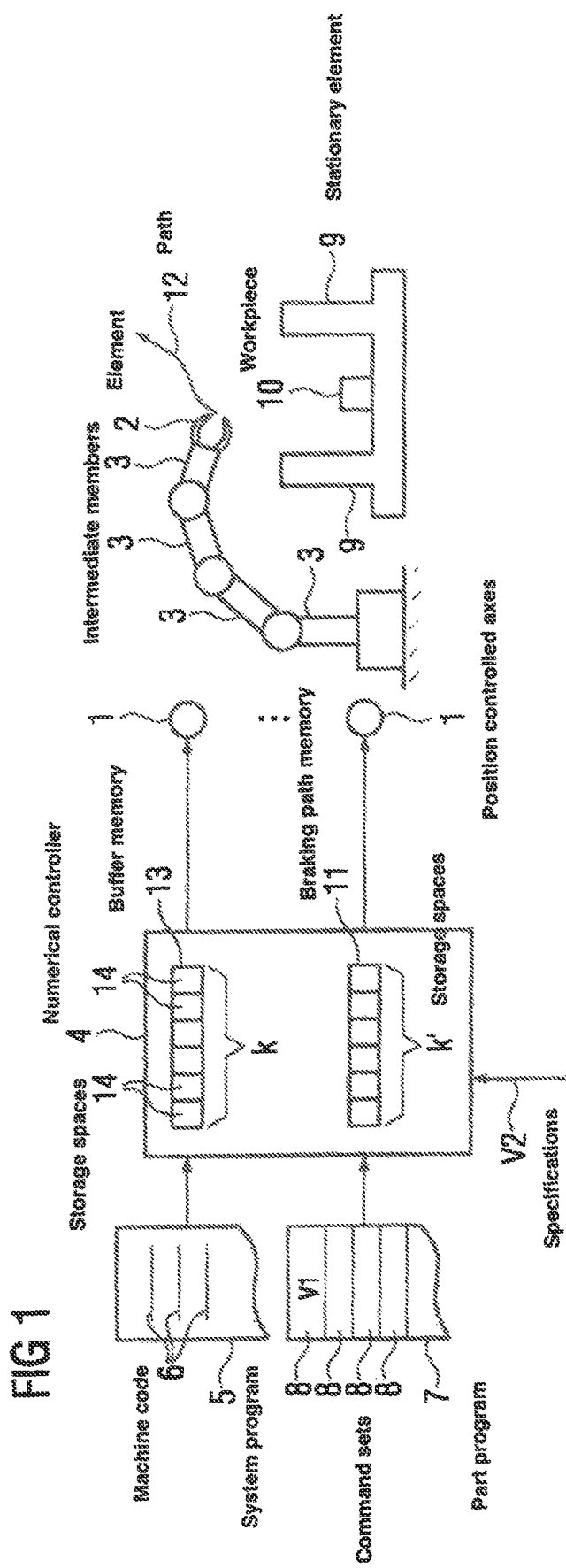
FIG. 1 shows a machine tool.

According to FIG. 1, a production machine has a plurality of position-controlled axes 1. Purely by way of example, a robot is shown in FIG. 1. The production machine may, however, be configured differently, for example, as a machine tool or as a handling machine.

An element 2 of the production machine is displaced by the position-controlled axes 1. The number of position-controlled axes 1 may be as required. Often, three to eight position-controlled axes 1 are present. With regard to the displacement movement, generally only the "actually desired" element 2 is considered, for example, in the case of the robot shown, a gripper. Strictly speaking, all the intermediate members 3 which are required for the movement of the actually desired element 2, in this case, therefore, the gripper, would also have to be considered.

The production machine furthermore has a numerical controller 4. The position-controlled axes 1 are actuated by means of the numerical controller 4 and the element 2 is displaced thereby. The numerical controller 4 is programmed with a system program 5. The system program 5 comprises machine code 6. On the basis of the programming of the numerical controller 4 with the system program 5, the numerical controller 4 executes the machine code 6. The execution of the machine code 6 by the numerical controller 4 causes the numerical controller 4 to carry out an operating method which is described in greater detail below with reference to FIG. 2. The numerical controller 4 thus carries out the operating method described below while executing the system program 5.

Firstly, in a step S1, the numerical controller 4 receives specifications V1, V2. The specifications V1, V2 may be known to the numerical controller 4 in advance, partially or fully, i.e. in principle a long time before the actuation of the position-controlled axes 1. For example, a part program T (see FIG. 1) may be preset for the numerical controller 4 and the specifications V1 may be defined by command sets 8 of the part program 7. The specifications V1, V2, however, may also be preset for the numerical controller 4 on an instantaneous basis, for example by an operator (not shown), in the form of direct specifications V2.

In a step S2, the numerical controller 4 ascertains a current group of position setpoint values $xi^*$ (where i=1, 2, . . . , n, where n is the number of position-controlled axes 1). The current group of position setpoint values $xi^*$ is the group of position setpoint values $xi^*$ with which the position-controlled axes 1 are currently to be actuated. When ascertaining the current group of position setpoint values $xi^*$, the numerical controller 4 utilizes the specifications V1, V2. The position setpoint values $xi^*$ may relate to a common coordinate system. In this case, the corresponding actuation values for the position-controlled axes 1 may possibly have to be ascertained by means of a kinematic transformation. Alternatively, the position setpoint values $xi^*$ may be the actuation values for the individual position-controlled axes 1, in a direct and immediate manner. In any case, the position setpoint values $xi^*$ of the respective group relate to a consistent time. They are therefore output to the position-controlled axes 1 at the same time.

The numerical controller 4 carries out its entire mode of operation in a timed manner. With each time interval T, a new current group of position setpoint values $xi^*$ is therefore output to the position-controlled axes 1 in each case. The time interval T may be as required. For example, it can be 4 ms or 2 ms or even 250 µs or 126 µs.

In step S2, the numerical controller 4 ascertains not only the current group of position setpoint values $xi^*$, but additionally also a plurality of expected groups of position setpoint values $xi^*$, i.e. a temporal sequence of groups of position setpoint values $xi^*$. The number k of ascertained expected groups of position setpoint values $xi^*$ therefore corresponds to a forecast horizon H=kT. The expected groups of position setpoint values $xi^*$ would be output to the position-controlled axes 1 at later times than the current group of position setpoint values $xi^*$, provided that deviations do not occur due to the specifications V1, V2 being changed. The expected groups of position setpoint values $xi^*$ are therefore fully analogous to the current group of position setpoint values $xi^*$ in terms of their type. For this reason, the same reference characters are also used.

In a step S3, the numerical controller 4 checks whether, during actuation of the position-controlled axes 1 with the current group of position setpoint values $xi^*$ ascertained in step S2, there is the risk of a collision. It is checked herein whether the risk of a collision of at least one element 2, 3 moved by the actuation of the position-controlled axes 1 with at least one other element 2, 3, 9, 10 exists. A comprehensive checking of all moved elements 2, 3 with all other elements 2, 3, 9, 10 coming into question therefore takes place. For example, it is checked whether the element 2 collides with one of the intermediate members 3, a stationary element 9 or, for example, also (where undesirable) with a workpiece 10. It is also checked, with regard to the intermediate members 3, whether they collide with another of the intermediate members 3, a stationary element 9 or, for example, with the workpiece 10. If the workpiece 10 is also moved, it is also checked with regard to the workpiece 10 whether it collides with a stationary element 9. The relevant checks as such are generally known to persons skilled in the art and therefore need not be described in detail. For example, the various elements 2, 3, 9, 10 can be modeled by means of elementary geometrical bodies, the movement of which is modeled taking into consideration the kinematic functional chain corresponding to the actuation of the individual position-controlled axes 1.

If the numerical controller 4 identifies in step S3 that there is the risk of a collision, the numerical controller 4 transfers to a step S4. In step S4, the numerical controller 4 brings the position-controlled axes 1 to a standstill. It thus stops the movement in order to avoid a collision. The details are discussed further below.

If the check does not show a risk of a collision, then the numerical controller 4 transfers to a step S5. In step S5, the numerical controller 4 performs a check for the ascertained expected groups of position setpoint values $xi^*$ that is fully analogous to step S3. If the numerical controller 4 identifies in step S5 that there is the risk of a collision, the numerical controller 4 transfers to step S4, if the check does not show a risk of a collision, then the numerical controller 4 transfers to a step S6.

In step S6, the numerical controller 4 actuates the position-controlled axes 1 with the current group of position setpoint values $xi^*$. Furthermore, in a step S7, the numerical controller 4 stores the expected groups of position setpoint values $xi^*$ ascertained in step S2 in a braking path memory 11. The numerical controller 4 then returns to step S1.

Figure 3:
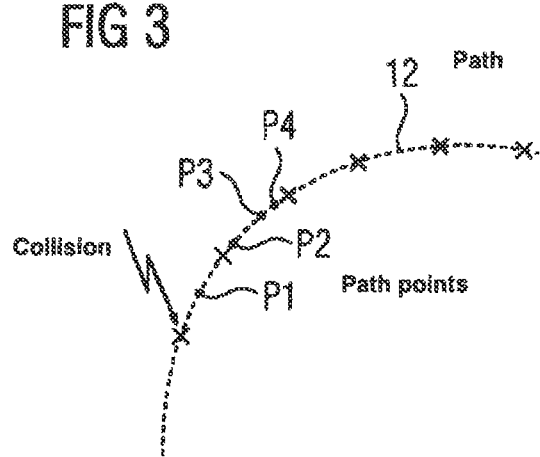
FIG. 3 shows a position diagram.

Due to the fact that the expected groups of position setpoint values $xi^*$ were checked for freedom from collisions before the storage in the braking path memory 11 and furthermore the expected groups of position setpoint values $xi^*$ form a temporal sequence, the expected groups of position setpoint values $xi^*$ stored in the braking path memory 11, according to the representation in FIG. 3, define a path 12 along which there is no threat of collision. In step S4, the numerical controller 4 is therefore able to read out the expected groups of position setpoint values $xi^*$ stored in the braking path memory 11. Based on the path 12 defined by the read-out expected groups of position setpoint values $xi^*$, the numerical controller 4 is thus able to ascertain emergency position setpoint values for the position-controlled axes 1 as part of step S4, so that the position-controlled axes 1 are brought to a standstill along the path 12. The shutdown therefore takes place on a "safe" path 12 in terms of being free from collisions. The stored expected groups of position setpoint values $xi^*$ are indicated by, small crosses in FIG. 3. Furthermore, in FIG. 3, P1 to P4 indicate purely exemplary points on the path 12 which are reached by the element 2 after a time interval T in each case when the position-controlled axes 1 come to a standstill. The associated position setpoint values for approaching in each case one of the points P1 to P4 each correspond to a group of emergency position setpoint values.

If the numerical controller 4 identifies the risk of a collision (indicated in FIG. 3 by a lightning bolt sign) and therefore transfers to step S4 and brings the position-controlled axes 1 to a standstill, a certain period of time is required to carry out the step S4. During this period of time, the position-controlled axes 1 are still being displaced. Preferably, the braking path memory 11 is dimensioned such that bringing the position-controlled axes 1 to a standstill is concluded before reaching the end of the path 12 (as defined by the expected groups of position setpoint values $xi^*$ stored in the braking path memory 11). A corresponding dimensioning of the braking path memory 11 is readily possible. In particular, the braking path memory 11 may have a suitable number $k'$ of storage spaces.

Figure 2:
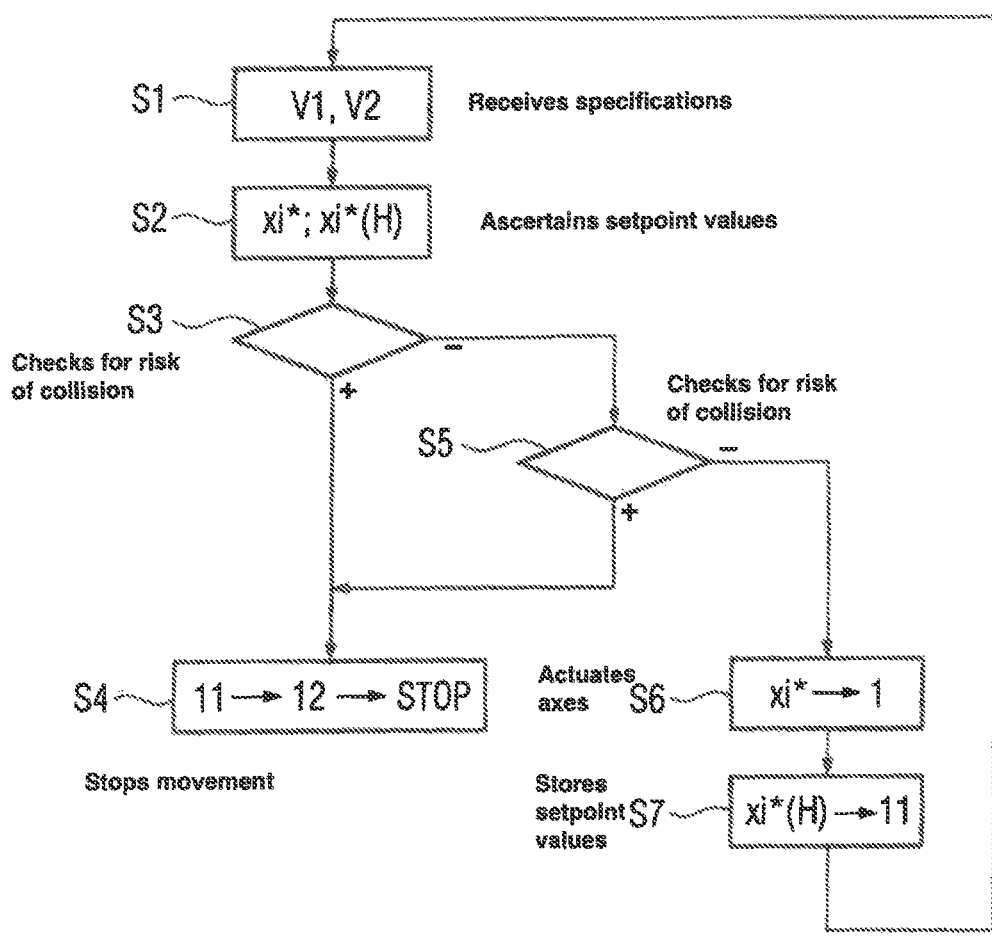
FIG. 2 shows a flow diagram.

It is possible for the numerical controller 4 to be able to carry out the steps S3 and S5 during a single time interval T. In this case, the procedure of FIG. 2 as well as explained above can be applied in a direct and immediate manner. It is also possible, however, for the numerical controller 4 to require multiple time intervals T to carry out the steps S3 and S5. Although the number of time intervals T required may vary, it is possible to specify an upper limit for this number. This upper limit is referred to as the first number of time intervals T in the following. In this case, the procedure of FIG. 2 is modified in that the numerical controller 4 delays the storage of the expected groups of position setpoint values $xi^*$ in the braking path memory 11 and the actuation of the position-controlled axes 1 by a number of time intervals T. In this context, the time frame of the delay is calculated as of the ascertaining of a new current group of position setpoint values $xi^*$. The corresponding number of time intervals T is referred to as the second number of time intervals T in the following.

Theoretically, the second number of time intervals may be determined independently of the first number of time intervals T. In practice, however, the second number of time intervals T is preferably measured such that the numerical controller 4, during the second number of time intervals T, is capable of checking for the entire forecast horizon H whether, when the position-controlled axes 1 are actuated with the expected groups of position setpoint values $xi^*$, there is the risk of a collision of at least one element 2, 3 moved by the actuation of the position-controlled axes (1) with at least one other element 2, 3, 9, 10. For example, according to the representation in FIG. 1, the numerical controller 4 may have a buffer memory 13 with a number of storage spaces 14. The number of storage spaces 14 in this case corresponds to the second number of time intervals T. In this case, the expected group of position setpoint values $xi^*$ to be output first after the current group of position setpoint values $xi^*$ are stored in the storage spaces 14 of the buffer memory 13, then the expected group of position setpoint values $xi^*$ to be output next, etc.

Should the specifications V1, V2 not change, then as a result only the last new expected group of position setpoint values $xi^*$ has to be newly ascertained and checked. This is readily possible in a single time interval T. The other expected groups of position setpoint values $xi^*$ can be transferred directly from the preceding iteration. For these, it is not necessary to check again, as they have already been checked.

If, however, the specifications V1, V2 change such that the "old" path 12, as defined by the content of the braking path memory 11 in the form of an "old" current group of position setpoint values $xi^*$ and "old" groups of position setpoint values $xi^*$ to be expected, has to be newly ascertained in the form of a new path with a "new" current group of position setpoint values $xi^*$ and "new" groups of position setpoint values $xi^*$ to be expected, as the "old" path is no longer fully comprised by the "new" path, then in the event that a collision is identified in the "new" path when checking, the groups of position setpoint values $xi^*$ stored in the buffer memory 13 (i.e. the "old" path) are read out of the buffer memory 13 by the numerical controller 4 in succession, according to their order, and used to actuate the position-controlled axes 1.

The consideration of the changed specifications V1, V2 is advantageously delayed until the new path 12 is fully checked for freedom from collisions.

Figure 4:
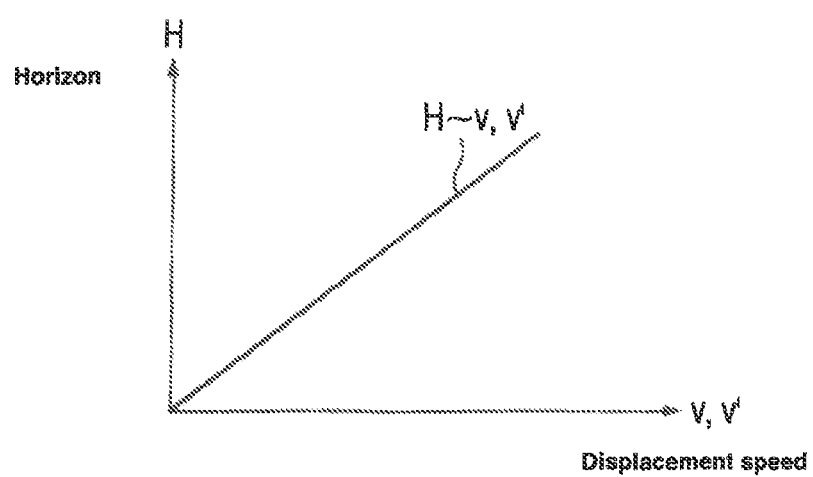
FIG. 4 shows a speed diagram.

It is possible for the forecast horizon H to be a constant. In this case, the second number of time intervals T and therefore the size of the buffer memory 13 is also preferably a constant. Alternatively, according to the representation in FIG. 4, it is possible for the numerical controller 4 to set the forecast horizon H dynamically as a function of the displacement speed V of at least one of the position-controlled axes 1, In this case, there may also be corresponding adaptation of the number of storage spaces 14 of the buffer memory 13. The displacement speed V may involve, for example, the displacement speed of the position-controlled axis 1 which needs the most time for stopping. Alternatively, it may involve a displacement speed derived from the totality of the displacement speeds of the position-controlled axes 1, in particular, the displacement speed v at which the moved element 2 is displaced.

In summary, the present invention therefore relates to the following subject:

A numerical controller 4, while utilizing specifications V1, V2 for position-controlled axes 1 of a production machine controlled by the numerical controller 4, ascertains a current group of position setpoint values $xi^*$ and furthermore ascertains groups of position setpoint values $xi^*$ expected for a forecast horizon H. It checks whether, during actuation of the position-controlled axes 1 with the current group of position setpoint values $xi^*$, there is the risk of a collision of at least one element 2, 3 moved by the actuation of the position-controlled axes 1 with at least one other element 2, 3, 9, 10. It performs the same check for the expected group of position setpoint values $xi^*$. If the numerical controller does not identify a risk of a collision, then it stores the expected groups of position setpoint values $xi^*$ in a braking path memory 11 and actuates the position-controlled axes 1 with the current group of position setpoint values $xi^*$. The numerical controller 4 repeats this procedure as long as it does not identify a risk of a collision. If, however, it identifies the risk of a collision, it brings the position-controlled axes 1 to a standstill along a path 12 that is defined by groups of position setpoint values $xi^*$ stored in the braking path memory 11.

The present invention has many advantages. In particular, a reliable stopping of the production machine without the risk of a collision can be achieved in almost all cases.

Although the invention has been illustrated and described in greater detail on the basis of the preferred exemplary embodiment, the invention is not limited by the disclosed examples and other variations can be derived herefrom by the person skilled in the art without leaving the scope of protection of the invention.

The invention claimed is:

1. A method of operating a numerical controller, said method comprising steps of:
    while utilizing specifications for position-controlled axes of a production machine controlled by the numerical controller, ascertaining, with the numerical controller, a current group of position setpoint values of the position-controlled axes and ascertaining groups of position setpoint values of the position-controlled axes expected for a forecast horizon;
    b) during actuation of the position-controlled axes with the current group of position setpoint values of the position-controlled axes, checking with the numerical controller whether there is a risk of collision of at least one element moved by the actuation of the position-controlled axes with at least one other element, and during actuation of the position-controlled axes with the expected group of position setpoint values of the position-controlled axes, checking with the numerical controller whether there is a risk of collision of at least one element moved by the actuation of the position-controlled axes with at least one other element;
    c) when no risk of a collision has been identified in step b), actuating with the numerical controller the position-controlled axes with the current group of position setpoint values of the position-controlled axes, storing with the numerical controller, the expected groups of position setpoint values of the position-controlled axes in a braking path memory, and repeating the operating method starting with step a); and
    d) when a risk of collision has been identified in step b), bringing with the numerical controller the position-controlled axes to a standstill along a path that is defined by the groups of position setpoint values of the position-controlled axes stored in the braking path memory, wherein if the specifications change such that an old path, as defined by a content of the braking path memory in an old current group of position setpoint values of the position-controlled axes and old groups of position setpoint values of the position-controlled axes to be expected, has to be newly ascertained as a new path with a new current group of position setpoint values of the position-controlled axes and new groups of position setpoint values of the position-controlled axes to be expected, as the old path is no longer fully comprised by the new path, then when a collision is identified in the new path when checking, the groups of position setpoint values of the position-controlled axes stored in the braking path memory are read out by the numerical controller and the numerical controller ascertains position setpoint values for the position-controlled axes so that the position-controlled axes are brought to a standstill along the old path.

2. The method of claim 1, wherein the numerical controller actuates the position-controlled axes with a time interval again in each case with a respective group of current position setpoint values of the position-controlled axes, the numerical controller requires a maximum of a first number of time intervals to carry out step b), the numerical controller delays the storage of the expected groups of position setpoint values of the position-controlled axes in the braking path memory, and the actuation of the position-controlled axes, calculated as of the ascertaining of a new current group of position setpoint values of the position-controlled axes, by a second number of time intervals.

3. The method of claim 2, wherein the second number of time intervals is measured such that the numerical controller, during the second number of time intervals, checks for the entire forecast horizon whether, when the position-controlled axes are actuated with the expected groups of position setpoint values of the position-controlled axes, there is the risk of a collision of at least one element moved by the actuation of the position-controlled axes with at least one other element.

4. The method of claim 1, wherein the numerical controller sets the second number of time Intervals in a dynamic manner as a function of a displacement speed of at least one of the position-controlled axes.

5. A system program for a numerical controller, wherein the system program comprises machine code in a non-transient computer readable medium, that when executed by the numerical controller, the machine code causes the numerical controller to carry out a method as set forth in claim 1.

6. A numerical controller, wherein the numerical controller is programmed with a system program as set forth in claim 5.

7. A production machine, comprising:
    a plurality of position-controlled axes;
    at least one element displaceable by the plurality of position-controlled axes; and
    a numerical controller comprising a system program which comprises machine code in a non-transient computer readable medium, that when executed by the numerical controller, the machine code causes the numerical controller to carry out a method as set forth in claim 1 so as to actuate the position-controlled axes.

* * * * *